United States Patent [19]
Dean et al.

[11] Patent Number: 5,777,546
[45] Date of Patent: Jul. 7, 1998

[54] METHOD OF SELECTION OF DESELECTION OF AUTOMATIC POWER DOOR LOCKS

[75] Inventors: Patrick D. Dean, Armada; Stephen L. Hyde, Clarkston, both of Mich.

[73] Assignee: Chrysler Corporation, Auburn Hills, Mich.

[21] Appl. No.: 598,554

[22] Filed: Feb. 8, 1996

[51] Int. Cl.$^6$ ............................................ B60Q 1/00
[52] U.S. Cl. ............... 340/438; 340/441; 180/289; 180/281; 70/264; 70/257; 70/237
[58] Field of Search .................................. 340/438, 439, 340/441, 644; 180/289, 281; 70/264, 257, 237

[56] References Cited

U.S. PATENT DOCUMENTS

| | | | |
|---|---|---|---|
| 3,630,305 | 12/1971 | Kazaoka | 180/287 |
| 3,830,332 | 8/1974 | Fontaine | 70/264 |
| 4,137,985 | 2/1979 | Winchell. | |
| 4,223,296 | 9/1980 | Kim et al. | |
| 4,450,545 | 5/1984 | Kishi et al. | 367/198 |
| 4,495,484 | 1/1985 | Kawakatsu et al. | |
| 4,572,320 | 2/1986 | Robbins, Jr. | |
| 4,670,746 | 6/1987 | Taniguchi et al. | |
| 4,672,375 | 6/1987 | Mochida et al. | |
| 4,702,094 | 10/1987 | Peterson. | |
| 4,709,776 | 12/1987 | Metz. | |
| 4,789,851 | 12/1988 | Hock et al. | |
| 4,825,210 | 4/1989 | Bachhuber et al. | |
| 4,870,409 | 9/1989 | Ogino | 70/264 |
| 4,922,224 | 5/1990 | Drori et al. | 340/426 |
| 4,935,677 | 6/1990 | Yoshida | 318/266 |
| 5,014,038 | 5/1991 | Leigh-Monstevens et al. | 180/287 |
| 5,111,902 | 5/1992 | Sundeen et al. | 180/281 |
| 5,113,174 | 5/1992 | Wake. | |
| 5,438,312 | 8/1995 | Lewis. | |
| 5,451,928 | 9/1995 | Cody. | |

*Primary Examiner*—Thomas Mullen
*Assistant Examiner*—Nina Tong
*Attorney, Agent, or Firm*—Roland A. Fuller, III

[57] ABSTRACT

A method of selection or deselection of automatic power door locks for an automotive vehicle includes the steps of inserting a key into an ignition switch of the automotive vehicle and rotating the key a predetermined number of times. The method also includes the steps of determining whether a power door lock switch was actuated and sounding an audible tone to verify selection or deselection of automatic power door locks if the power door lock switch was actuated.

20 Claims, 2 Drawing Sheets

METHOD OF SELECTION OF DESELECTION OF AUTOMATIC POWER DOOR LOCKS

BACKGROUND OF THE INVENTION

1. Field of the Invention

The present invention relates generally to automatic door locks for vehicles and, more particularly, to a method of verifying selection of automatic power door locks for an automotive vehicle.

2. Description of the Related Art

Vehicles such as automotive vehicles have been equipped with power door locks. Typically, a door lock switch is located on each front door trim panel and an operator actuates this switch to lock or unlock the doors of the vehicle. Such vehicles have also been equipped with automatic power door locks. For example, the doors will lock automatically on vehicles with power door locks if the vehicle transaxle is in gear, all doors of the vehicle are closed and the vehicle speed is above a predetermined speed.

Although the above automatic power door locks have worked well, many vehicle operators favor nonautomatic door locking systems or at times prefer to turn off this feature. As a result, there is a need in the art for selecting and deselecting this feature. Also, there is a need in the art for a means of feedback to indicate when the proper programming sequence has been followed.

SUMMARY OF THE INVENTION

It is, therefore, one object of the present invention to provide a method of selection or deselection of automatic power door locks for an automotive vehicle.

It is another object of the present invention to provide an audible feedback to the operator that the selection of automatic power door locks has been accepted.

To achieve the foregoing objects, the present invention is a method of selection or deselection of automatic power door locks for an automotive vehicle. The method includes the steps of inserting a key into an ignition switch of the automotive vehicle and rotating the key a predetermined number of times. The method also includes the steps of determining whether a power door lock switch was actuated and sounding an audible tone to verify selection or deselection of automatic power door locks if the power door lock switch was actuated.

One advantage of the present invention is that a method is provided of selection or deselection of automatic power door locks for an automotive vehicle. Another advantage of the present invention is that the method provides an audible feedback to the operator that the selection of automatic power door locks has been accepted.

Other objects, features and advantages of the present invention will be readily appreciated as the same becomes better understood after reading the subsequent description taken in conjunction with the accompanying drawings.

DESCRIPTION OF THE PREFERRED EMBODIMENT(S)

Figure 1:
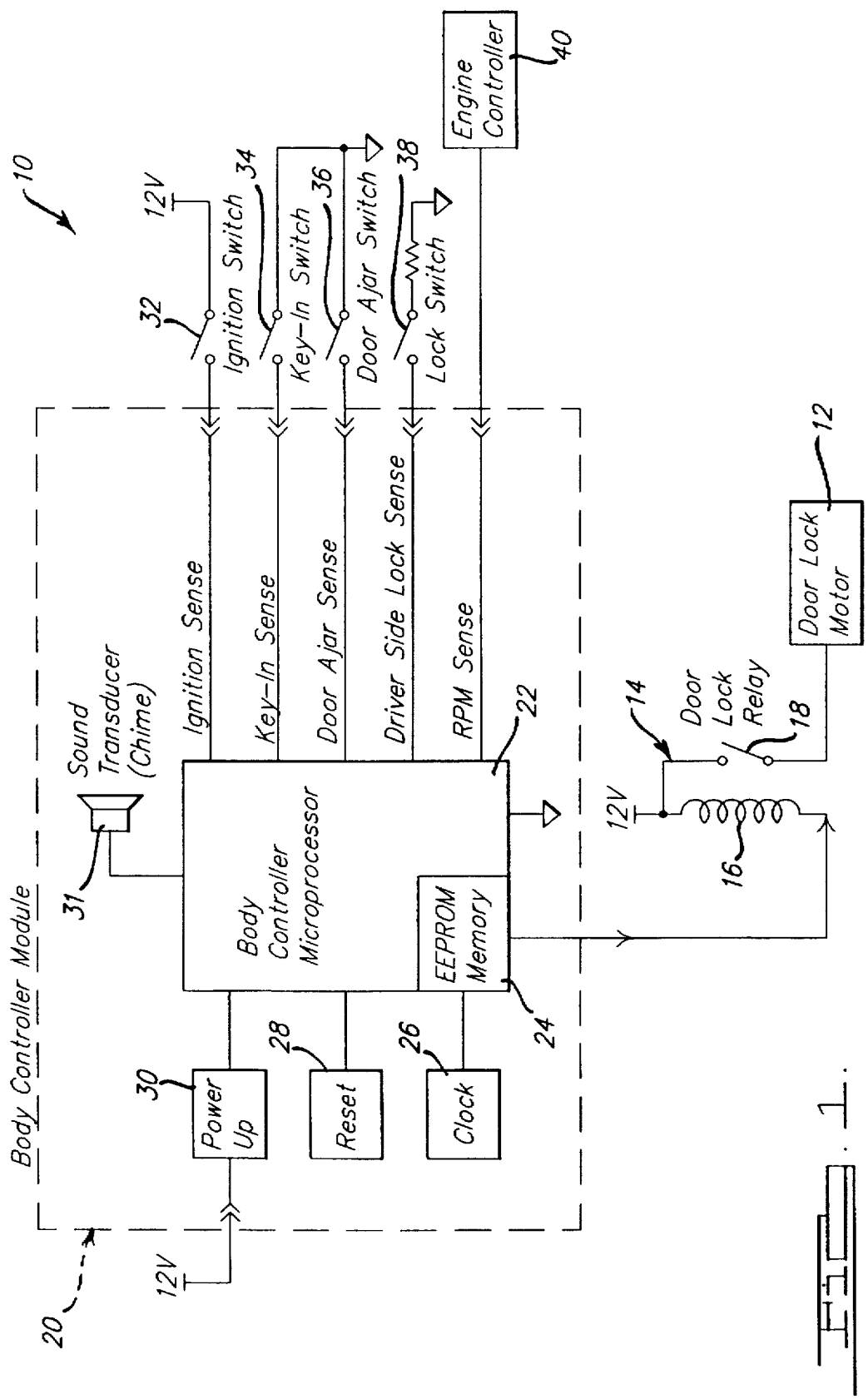
FIG. 1 is a diagrammatical view of a power door lock system used in conjunction with a method, according to the present invention.

Referring to FIG. 1, a power door lock system 10 is shown for a vehicle such as an automotive vehicle (not shown). The power door lock system 10 includes a door lock motor 12 which moves a lock plunger (not shown) to lock and unlock a door (not shown) of the automotive vehicle. It should be appreciated that the lock plunger and associated hardware for locking and unlocking the door is conventional and known in the art.

The power door lock system 10 also includes a door lock relay 14 having an inductor 16 and switch 18 in parallel. The inductor 16 has one end electronically connected to a power source such as a twelve volt (12v) battery (not shown) and the switch 18. The other end of the switch 18 is electronically connected to the door lock motor 12. It should be appreciated that when the inductor 16 is energized, the switch 18 is closed and power from the power source flows to the door lock motor 12.

The power door lock system 10 includes a controller such as a body controller, generally indicated at 20. The body controller 20 includes a microprocessor 22 having memory 24 and is electrically connected to the inductor 16 of the door lock relay 14. The body controller 20 also includes a clock circuit 24 electrically connected to the microprocessor 22 for providing pulses of time to the microprocessor 22 and a reset circuit 26 electrically connected to the microprocessor 22 for resetting the microprocessor 22. The body controller 20 further includes a power up circuit 30 electrically connected to the power source and the microprocessor 22 for regulating power to the microprocessor 22 from the power source. The body controller 20 also includes a sound transducer or chime 31 electrically connected to the microprocessor 22 for providing an audible tone.

The power door lock system 10 further includes an ignition switch 32 electrically connected to the body controller 20 and the power source to provide an input signal of ignition and a key-in switch 34 electrically connected to the body controller 20 to provide an input signal of the key in the ignition. The power door lock system 10 includes a door ajar switch 36 electrically connected to the body controller 20 to provide an input signal that a door of the vehicle is ajar. The power door lock system 10 includes a lock switch 38 electrically connected to the body controller 20 to provide an input signal that a driver side power door lock switch was actuated. Additionally, an engine controller 40 is electrically connected to the body controller 20 to provide an input signal of vehicle speed (RPM). It should be appreciated that the power door lock system 10 is conventional and known in the art.

Figure 2:
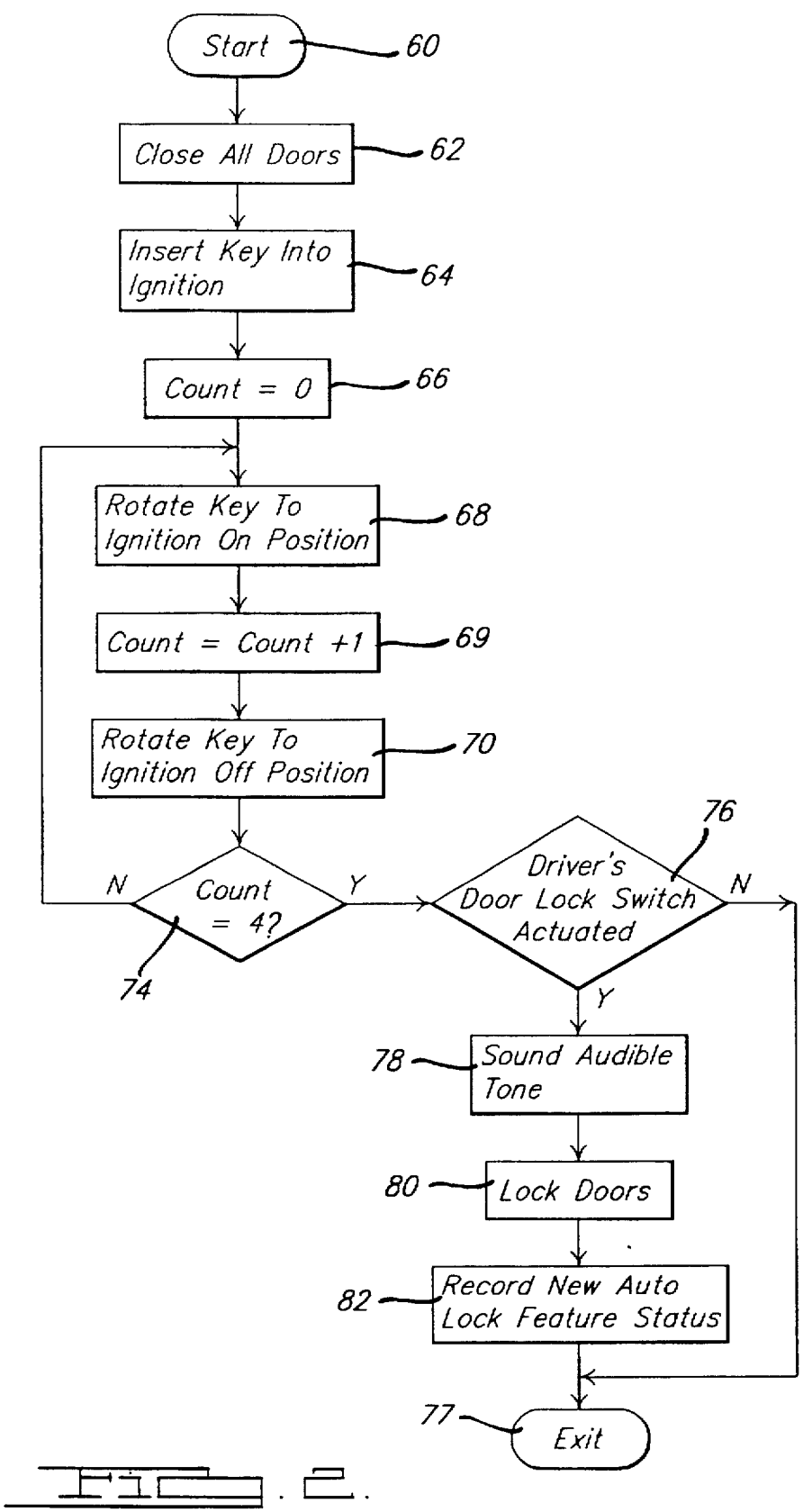
FIG. 2 is a flowchart of a method of verifying selection of automatic power door locks, according to the present invention, for the power door lock system of FIG. 1.

Referring to FIG. 2, a method, according to the present invention, is shown for verifying selection of automatic power door locks for the power door lock system 10. The microprocessor 22 closes the door lock relay 14 to energize the door lock motor 12 and automatically lock the doors if predetermined conditions are met. For example, the predetermined conditions may be that the vehicle is in gear, all doors are closed and the vehicle speed is above a predetermined speed such as sixteen miles per hour (16) mph. If the door lock switch 38 is actuated when the key is in the ignition switch 32 and any door is ajar (open), the power door lock system 12 will not operate. It should be appreciated that removing the key or closing the door will allow the door lock system 12 to operate.

The methodology starts in bubble 60 and advances to block 62. In block 62, a vehicle operator closes all of the doors of the vehicle. The methodology advances to block 64 and the vehicle operator inserts a key into the ignition switch 32 of the vehicle. The key-in-switch 34 is closed. The methodology advances to block 66 and the microprocessor 22 initializes a count to zero (0). After block 66, the methodology advances to block 68 and the operator rotates the key between the OFF(open) and ON(closed) position of the ignition switch 32. The methodology advances to block 69 and the microprocessor 22 increments the previously mentioned count by one (1). The methodology advances to block 70 and the operator rotates the key between the ON(closed) position and OFF(open) position of the ignition switch 32. The methodology advances to diamond 74 and determines whether the count is equal to or greater than a predetermined count such as four (4) stored in memory 24. This puts the body controller 20 into a "learn mode". If not, the methodology advances to block 68 previously described. If so, the methodology advances to diamond 76 and determines whether the driver side power door lock switch 38 was actuated. The vehicle operator depresses the driver side power door lock switch 38 to toggle enable/disable state of the automatic door lock feature. If not, the methodology advances to bubble 77 and exits the routine. If so, the methodology advances to block 78 and sounds an audible tone. The microprocessor 22 energizes the sound transducer 31 to send an audible tone to the vehicle operator to verify selection of automotive power door locks.

After block 78, the methodology advances to block 80 and locks the doors. The microprocessor 22 actuates the door lock relay 14 to energize the door lock motor 12 and automatically lock the doors of the vehicle. The methodology advances to block 82 and records new automatic door lock feature status in the microprocessor 22. The methodology then advances to bubble 77 and exits the routine. It should be appreciated that the body controller 20 exits the "learn mode" on each ignition cycle, if the vehicle is started, or the key is removed from the ignition switch 32.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. A method of selection or deselection of automatic door locks for an automotive vehicle, said method comprising the steps of:

inserting a key into an ignition switch of the automotive vehicle;

rotating the key a predetermined number of times;

determining whether a power door lock switch was actuated; and sounding an audible tone to verify selection or deselection of automatic power door locks if the power door lock switch was actuated.

2. A method as set forth in claim 1 including the step of closing all doors of the automotive vehicle prior to said step of inserting.

3. A method as set forth in claim 1 including the step of determining whether the ignition switch is On after said step of rotating.

4. A method as set forth in claim 3 including the step of counting an increment if the ignition switch is ON.

5. A method as set forth in claim 3 including the step of determining whether a count of the ignition switch ON is equal to a predetermined count if the ignition switch is OFF.

6. A method as set forth in claim 5 including the step of determining whether the power door lock switch was actuated if the count is equal to the predetermined count.

7. A method as set forth in claim 1 including the step of determining whether the ignition switch is OFF after said step of rotating.

8. A method as set forth in claim 1 including the step of locking the doors after said step of sounding.

9. A method as set forth in claim 8 including the step of recording a status of the automatic door lock feature.

10. A method of selection or deselection of automatic door locks for an automotive vehicle, said method comprising the steps of:

inserting a key into an ignition switch of the automotive vehicle;

rotating the key a predetermined number of times;

determining whether a driver side power door lock switch was actuated; and sounding an audible tone to verify selection of automatic power door locks if the driver side power door lock switch was actuated.

11. A method as set forth in claim 10 including the step of closing all doors of the automotive vehicle prior to said step of inserting.

12. A method as set forth in claim 10 including the step of determining whether the ignition switch is On after said step of rotating.

13. A method as set forth in claim 12 including the step of counting an increment if the ignition switch is ON.

14. A method as set forth in claim 12 including the step of determining whether a count of the ignition switch ON is equal to a predetermined count if the ignition switch is OFF.

15. A method as set forth in claim 14 including the step of determining whether the driver side power door lock switch was actuated if the count is equal to the predetermined count.

16. A method as set forth in claim 10 including the step of determining whether the ignition switch is OFF after said step of rotating.

17. A method as set forth in claim 10 including the step of locking the doors after said step of sounding.

18. A method as set forth in claim 17 including the step of recording a status of the automatic door lock feature.

19. A method of selection or deselection of automatic door locks for an automotive vehicle, said method comprising the steps of:

closing all doors of the automotive vehicle;

inserting a key into an ignition switch of the automotive vehicle;

rotating the key to an ignition ON position;

determining whether the ignition switch is in the ON position;

incrementing a count if the ignition switch is in the ON position;

rotating the key to an ignition OFF position;

determining whether the count of the ignition switch ON is equal to a predetermined count if the ignition switch is in the OFF position;

determining whether the power door lock switch was actuated if the count is equal to the predetermined count;

sounding an audible tone to verify selection of automatic power door locks if the power door lock switch was actuated; and locking the doors of the automotive vehicle.

20. A method as set forth in claim 19 including the step of recording a status of the automatic door lock feature.

* * * * *

UNITED STATES PATENT AND TRADEMARK OFFICE
CERTIFICATE OF CORRECTION

PATENT NO. : 5,777,546
DATED : July 7, 1998
INVENTOR(S) : Patrick D. Dean, et. al.

It is certified that error appears in the above-indentified patent and that said Letters Patent is hereby corrected as shown below:

Title page, item [54] and col. 1, line 1, in the title, delete of and insert --or-- (second occurrence)

Signed and Sealed this

Nineteenth Day of October, 1999

Attest:

Q. TODD DICKINSON

*Attesting Officer*  *Acting Commissioner of Patents and Trademarks*